US007377140B2

(12) United States Patent
Shen et al.

(10) Patent No.: US 7,377,140 B2
(45) Date of Patent: May 27, 2008

(54) LOCK WITH CLUTCHING FUNCTION

(75) Inventors: Mu-Lin Shen, Tainan (TW); Chung-Liang Lin, Annan (TW)

(73) Assignee: I-Tek Metal Mfg. Co., Ltd., Tainan (TW)

( * ) Notice: Subject to any disclaimer, the term of this patent is extended or adjusted under 35 U.S.C. 154(b) by 225 days.

(21) Appl. No.: 11/380,122

(22) Filed: Apr. 25, 2006

(65) Prior Publication Data

US 2007/0245782 A1 Oct. 25, 2007

(51) Int. Cl.
*E05B 59/00* (2006.01)
*B60R 25/02* (2006.01)

(52) U.S. Cl. ............................ 70/107; 70/149; 70/218; 70/472; 70/222

(58) Field of Classification Search .................. 70/107, 70/149, 472, 218, 221–224; 292/DIG. 27, 292/165, 336.5, 169.14–169.17, 169.21–169.23
See application file for complete search history.

(56) References Cited

U.S. PATENT DOCUMENTS

| | | | | |
|---|---|---|---|---|
| 4,108,482 | A * | 8/1978 | Dietrich et al. | 292/165 |
| 4,583,382 | A | 4/1986 | Hull | |
| 6,351,976 | B1 * | 3/2002 | Chen | 70/224 |
| 6,354,121 | B1 * | 3/2002 | Frolov | 70/277 |
| 6,619,705 | B2 * | 9/2003 | Dalsing | 292/169.14 |
| 6,622,535 | B2 * | 9/2003 | Chiang et al. | 70/107 |
| 6,802,194 | B1 * | 10/2004 | Shen | 70/223 |
| 6,837,081 | B2 * | 1/2005 | Ruano Aramburu et al. | 70/218 |
| 6,993,945 | B1 * | 2/2006 | Chen | 70/472 |
| 6,993,946 | B1 | 2/2006 | Shen | |
| 2002/0144526 | A1 * | 10/2002 | Ming-Chih | 70/218 |
| 2003/0019256 | A1 * | 1/2003 | Frolov | 70/222 |

* cited by examiner

*Primary Examiner*—Suzanne Dino Barrett
(74) *Attorney, Agent, or Firm*—Alan Kamrath; Kamrath & Associates PA

(57) ABSTRACT

A lock includes a body, a wheel, an outside spindle, and a locking plug. The outside spindle includes a front end having an extension not in contact with a circumferential wall defining a through-hole of the wheel. When the locking plug is in an unblocking position allowing retraction operation of a latch bolt, the front end of the outside spindle is engaged with the wheel to allow joint rotation of the outside spindle and the wheel. When the locking plug is moved from the unblocking position to the blocking position not allowing retraction operation of the latch bolt, movement of a push member pushes the front end of the outside spindle away from the through-hole of the wheel such that the front end of the outside spindle is disengaged from the circumferential wall of the through-hole of the wheel, thereby disengaging the outside spindle from the wheel.

14 Claims, 7 Drawing Sheets

LOCK WITH CLUTCHING FUNCTION

BACKGROUND OF THE INVENTION

1. Field of the Invention

The present invention relates to a lock. More particularly, the present invention relates to a lock with a clutch function, allowing free rotation of the outer handle when the lock is in a locked state.

2. Description of the Related Art

U.S. Pat. No. 4,583,382 to Hull discloses a door lock with an outside handle that cannot be turned when in a locked state. However, the internal parts of the door lock could be damaged if the outside handle is frequently depressed when the user is not aware of the locking state of the lock. Also, the internal parts of the door lock could be damaged if overtorque is applied to the outside handle.

U.S. Pat. No. 6,993,946 to Shen discloses a lock that allows free rotation of the outside handle when the lock is in a locked state. However, assembly of the lock is troublesome.

SUMMARY OF THE INVENTION

An objective of the present invention is to provide a lock with a clutching function to allow free rotation of the outside handle while providing a simplified structure to allow easy assembling procedures.

A lock in accordance with the present invention comprises a body, a latch bolt mounted in the body, a wheel pivotally mounted in the body and operable to retract the latch bolt from an extended position to a retracted position, an outside spindle adapted to be mounted to an outside handle, a spring, a locking plug, and a push member mounted on the locking plug.

The wheel includes a through-hole defined by a circumferential wall. The outside spindle includes a front end having an extension. The extension is not in contact with the circumferential wall of the through-hole of the wheel. The spring is mounted in the outside handle for biasing the front end of the outside spindle into the through-hole of the first wheel, allowing joint rotation of the wheel and the outside spindle. The locking plug is mounted in the body and movable between an unblocking position allowing retraction operation of the latch bolt and a blocking position not allowing retraction operation of the latch bolt.

When the locking plug is in the unblocking position, the front end of the outside spindle is engaged with the wheel to allow joint rotation of the outside spindle and the wheel. When the locking plug is moved from the unblocking position to the blocking position, movement of the push member pushes the front end of the outside spindle away from the through-hole of the wheel such that the front end of the outside spindle is disengaged from the circumferential wall of the through-hole of the wheel, thereby disengaging the outside spindle from the wheel.

Preferably, the lock further comprises another wheel pivotally mounted in the body and adapted for cooperating with an inside spindle. This wheel is operable to retract the latch bolt from the extended position to the retracted position. A spacer ring is mounted between the two wheels and includes an opening. The front end of the push member extends through the opening of the spacer ring to a position between the two wheels.

Preferably, the extension of the outside spindle is remained in and not in contact with the circumferential wall defining through-hole of the wheel when the locking plug is in the blocking position.

In an embodiment, the push member is a member releasably mounted to the locking plug. The locking plug includes a recess. The push member includes a rear end mounted in the recess and a front end having an inclined face for pressing against and thus moving the extension of the outside spindle.

Preferably, the front end of the push member is arrow-shaped.

Preferably, the push member extends in a direction transverse to the longitudinal direction of the outside spindle.

Preferably, the extension of the outside spindle is conic.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
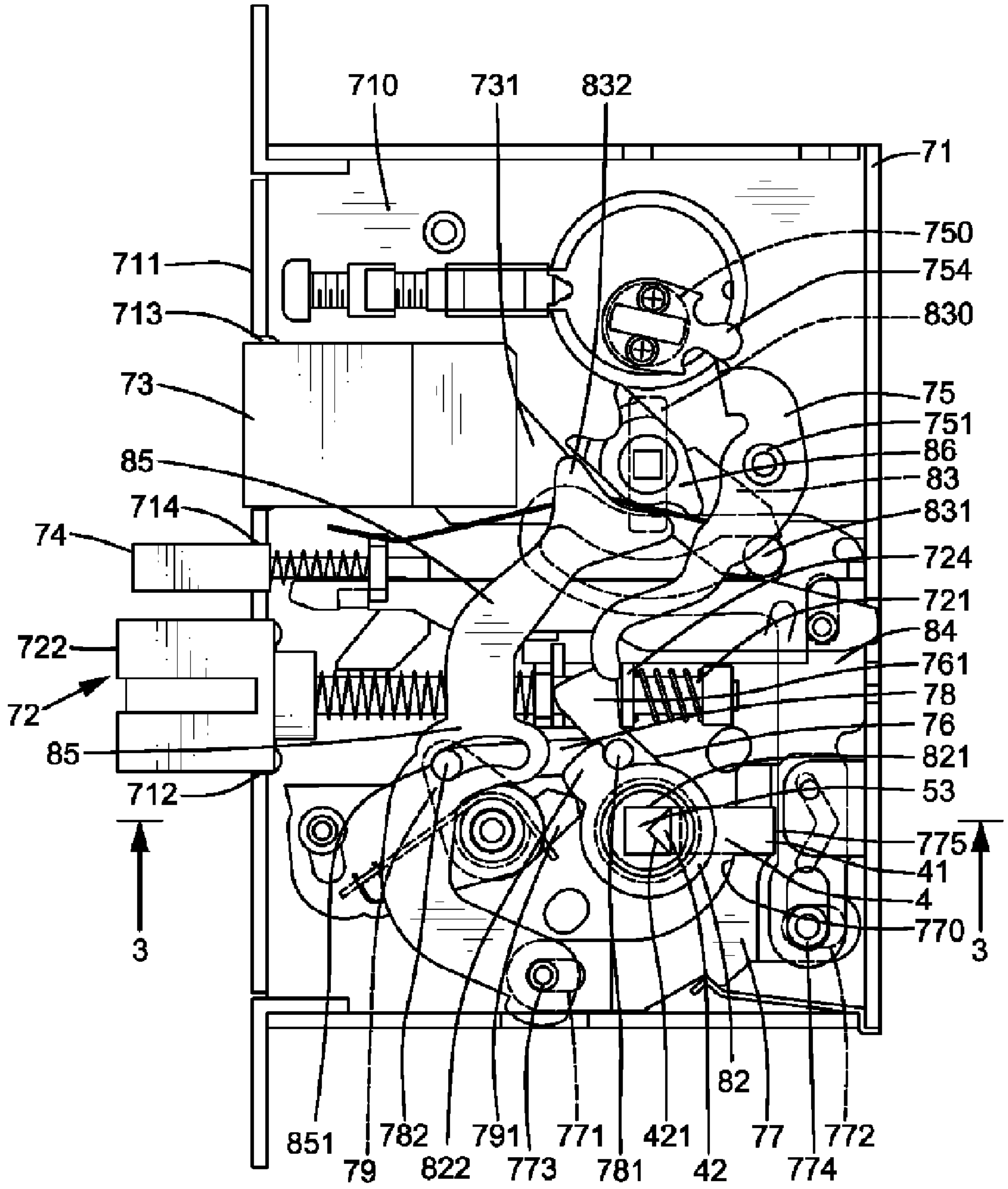
FIG. 1 is an elevational view of a lock in accordance with the present invention mounted to a door, wherein a lid of the lock is removed.
Figure 2:
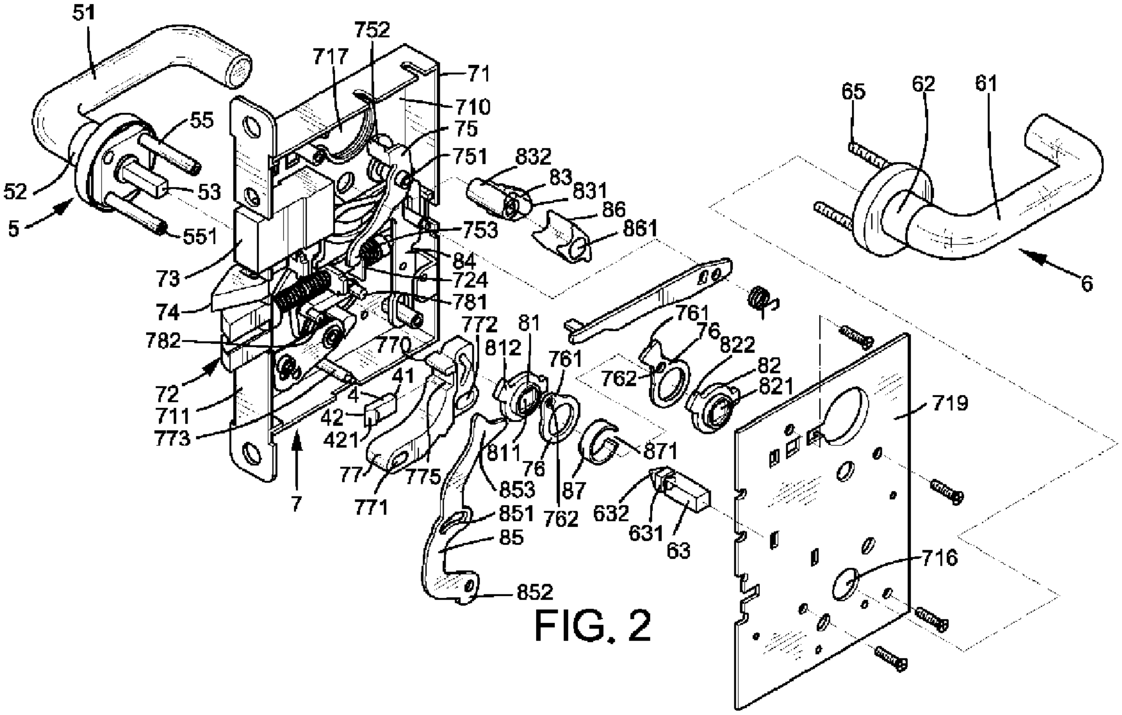
FIG. 2 is an exploded perspective view of the lock in accordance with the present invention.
Figure 3:
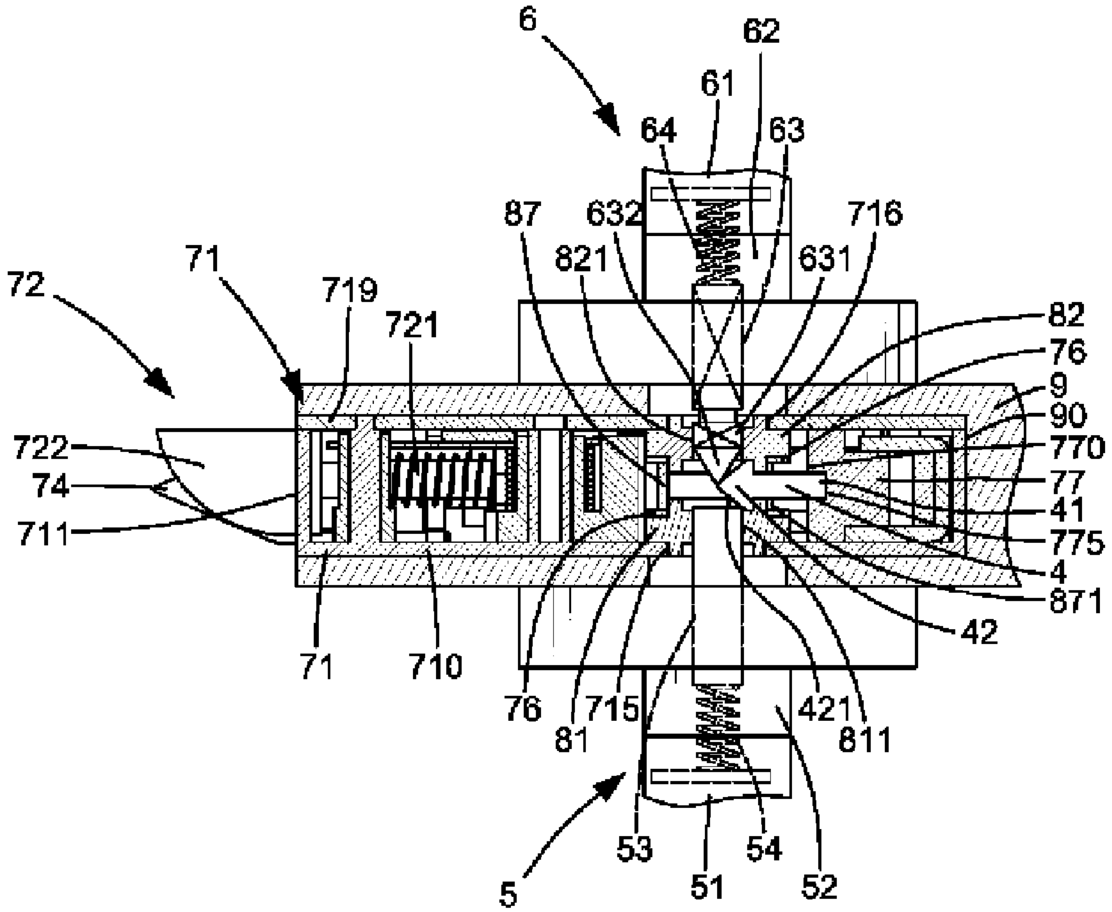
FIG. 3 is a sectional view taken along plane 3-3 in FIG. 1.

Referring to FIGS. 1 through 3, a lock in accordance with the present invention comprises an inside handle assembly 5, an outside handle assembly 6, and a body 7 between the inside and outside handle assemblies 5 and 6.

The inside handle assembly 5 includes an inside handle 51 and an inside spindle 53 mounted to an end 52 of the inside handle 51. The outside handle assembly 6 includes an outside handle 61 and an outside spindle 63 mounted to an end 62 of the outside handle 61. The inside handle assembly 5 and the outside handle assembly 6 are assembled together and respectively fixed to two sides of the body 7 by bolts 65 and mounting rods 55 with screw holes 551. The inside and outside spindles 53 and 63 are square in this embodiment.

The body 7 is mounted in a groove or compartment 90 in a door 9 and includes a case 71 and a lid 719 for covering the case 71. The case 71 includes an outer end face 711 having three openings 712, 713, and 714 into which a latch bolt 72, a dead bolt 73, and an auxiliary bolt 74 are respectively mounted. The case 71 further includes a lateral side 710 having a hole 715 that is aligned with a hole 716 in the lid 719 that forms the other lateral side of the case 71 after assembly.

A wheel 81 is pivotably mounted in the hole 715 of the lateral side 710 of the case 71 and includes a square through-hole 811 through which the inside spindle 53 extends. Another wheel 82 is pivotably mounted in the hole 716 of the lid 719 and includes a square through-hole 821 through which the outside spindle 63 extends. Turning of either handle 51, 61 causes pivotal movement of the associated wheel 81, 82. Each wheel 81, 82 further includes a tooth 812, 822. Further, the wheels 81 and 82 are spaced from each other by a spacer ring 87.

The latch bolt 72 includes a head 722 and a shank 721 extending from the head 722 through the opening 712. The head 722 of the latch bolt 72 is normally biased by a spring (not labeled) to an extended, latching position outside the case 71. A substantially U-shaped bracket 724 is mounted on the shank 721 of the latch bolt 72 and drivable by a lever link 75 or one of two drive members 76.

The lever link 75 is mounted in the case 71 and pivotable about a pivot 751. The lever link 75 includes an intermediate portion (not labeled) pivotally mounted around the pivot 751, a first end 752, and a second end 753 engaged with the bracket 724 of the latch bolt 72. A lock core 750 is rotatably mounted in a hole 717 in the lateral side 710 of the case 71 and includes an actuating member 754. In a case that the dead bolt 73 is in an extended, locking position, when the lock core 750 is turned by a key, the dead bolt 73 is firstly retracted. Further turning of the lock core 750 causes the actuating member 754 to engage with the first end 752 of the lever link 75 and to turn the lever link 75. The bracket 724 is moved inward by the second end 753 of the lever link 75, thereby retracting the latch bolt 72.

The drive members 76 are mounted between the wheels 81 and 82 and spaced by the spacer ring 87. Each drive member 76 includes a lug 761 for pushing the bracket 724 of the latch bolt 72. A linking member 78 is also mounted in the case 71 and includes a first pin 781 on an end thereof and a second pin 782 on the other end thereof. The first pin 781 extends through a hole 762 in each lug 761. A cam 79 is rotatably mounted to the lateral side 710 of the case 71 and engaged with the second pin 782. The cam 79 includes a projection 791.

When either wheel 81, 82 is turned clockwise through operation of the associated handle 51, 61 (see FIG. 4), the tooth 812, 822 of the wheel 81, 82 pushes the first pin 781 clockwise, causing clockwise movement of the lug 761, which, in turn, moves the bracket 724 inward, thereby retracting the latch bolt 72.

On the other hand, when either wheel 81, 82 is turned counterclockwise, the tooth 812, 822 of the wheel 81, 82 pushes against the projection 791 on the cam 79, causing rotation of the cam 79. The lug 761 of the drive member 76 is moved inward through transmission by the linking member 78. Thus, the latch bolt 72 is retracted.

Also mounted in the case 71 and located adjacent to the wheel 82 is a locking plug 77 comprising two slots 771 and 772 in which two pivots 773 and 774 are slidably received. The locking plug 77 further includes a face 770.

A pivotal member 83 is pivotally mounted to the lateral side 710 of the case 71 and includes an axle 832 and an actuating portion 831. A thumb turn 830 is engaged with the pivotal member 83 to turn therewith. The actuating portion 831 is slidably received in a slot (not shown) in a shank 731 of the dead bolt 73. When the pivotal member 83 is turned by turning the thumb turn 830, the dead bolt 73 is moved between an extended, locking position and a retracted, unlocking position.

A cam 86 includes a longitudinal hole 861 for securely engaging with the axle 832 of the pivotal member 83, allowing joint rotation of the cam 86 and the pivotal member 83. A follower plate 84 is mounted in the case 70 and connected to the locking plug 77 so that upward/downward movement (as viewed from FIG. 1) of the follower plate 84 causes leftward/rightward movement (as viewed from FIG. 1) of the locking plug 77. When the thumb turn 830 is turned while the dead bolt 73 remains in the retracted, locking position, the pivotal member 83 pivots, and the actuating portion 831 drives the follower plate 84 to move upward/downward, thereby moving the locking plug 77 leftward/rightward.

The second pin 782 of the linking member 78 extends through a slot 851 in a rocker arm 85 that is pivotally mounted in the case 71 at a first end 852 thereof. A second end 853 of the rocker arm 85 abuts against the cam 86 that turns jointly with the pivotal member 83. When the dead bolt 73 is in the extended, locking position, turning of the inside handle 51 causes turning of the wheel 81, which, in turn, causes the cam 79 to turn clockwise. The second end 851 of the rocker arm 85 presses against the cam 86 and thus turns the pivotal member 83 to retract the dead bolt 73 into the case 71, achieving the unlocking function. Of course, turning of the inside handle 51 also unlatches the latch bolt 72.

The thumb turn 830 is movable between an unblocking position (in which the follower plate 84 is in its upper position, the locking plug 77 is in its right, unblocking position not engaging with the tooth 812, 822 of the associated wheel 81, 82, and the dead bolt 73 is in its retracted state, see FIG. 1), a blocking position (in which the follower plate 84 is in its lower position, the locking plug 77 is in its left, blocking position engaging with the tooth 812, 822 of the associated wheel 81, 82, and the dead bolt 73 is in its retracted state), and a locking position (in which the follower plate 84 is in its lower position, the locking plug 77 is in its left, blocking position engaging with the tooth 812, 822 of the associated wheel 81, 82, and the dead bolt 73 is in its extended state).

Referring to FIG. 3, a spring 64 is mounted behind the outside spindle 63 for biasing a front end 641 of the outside spindle 63 into the through-hole 821 of the wheel 82, allowing transmission of torque resulting from turning of the outside handle 61 for the purposes of retracting the latch bolt 72.

Still referring to FIG. 3, a spring 54 is mounted behind the inside spindle 54 for biasing a front end (not labeled) of the inside spindle 53 into the through-hole 811 of the wheel 81, allowing transmission of torque resulting from turning of the inside handle 51 for the purposes of retracting the latch bolt 72.

The above structure and operations are conventional. Of more importance, the outside spindle 63 is disengaged from the wheel 82 when in a locked state. Further, engagement or disengagement of the outside spindle 63 with or from the wheel 82 is reliable.

Referring to FIGS. 2 and 3, a push member 4 is mounted to the face 770 of the locking plug 77. In the illustrated embodiment, the push member 4 is a separate member fixed to the face 770 of the locking plug 77 and movable in the moving direction of the latch bolt 72 together with the locking plug 77. Alternatively, the push member 4 may be an integral member projecting from the face 770 of the locking plug 77.

The push member 4 includes a front end 42 and a rear end 41. The rear end 41 of the push member 5 is engaged in a recess 775 in the face 770 of the locking plug 77. The front end 42 of the push member 4 extends through an opening 871 of the spacer ring 87 to a position between the wheels 81 and 82. The front end 42 of the push member 4 includes at least one inclined face 421. In the illustrated embodiment, the front end 42 of the push member 4 is arrow-shaped having two opposed inclined faces 421.

Further, the front end 631 of the outside spindle 63 includes an extension 632 extending along a longitudinal direction of the outside spindle 63. The extension 632 has a reduced diameter and is thus not in contact with a circumferential wall defining the through-hole 821 of the wheel 82. In the illustrated embodiment, the extension 632 and has a conic section with a conic face (not labeled) at a front end thereof. When the outside spindle 63 is biased by the spring 64 into the through-hole 821 of the wheel 82, the conic face of the extension 632 is stopped and thus positioned by the inclined face 421 of the push member 4.

Figure 4:
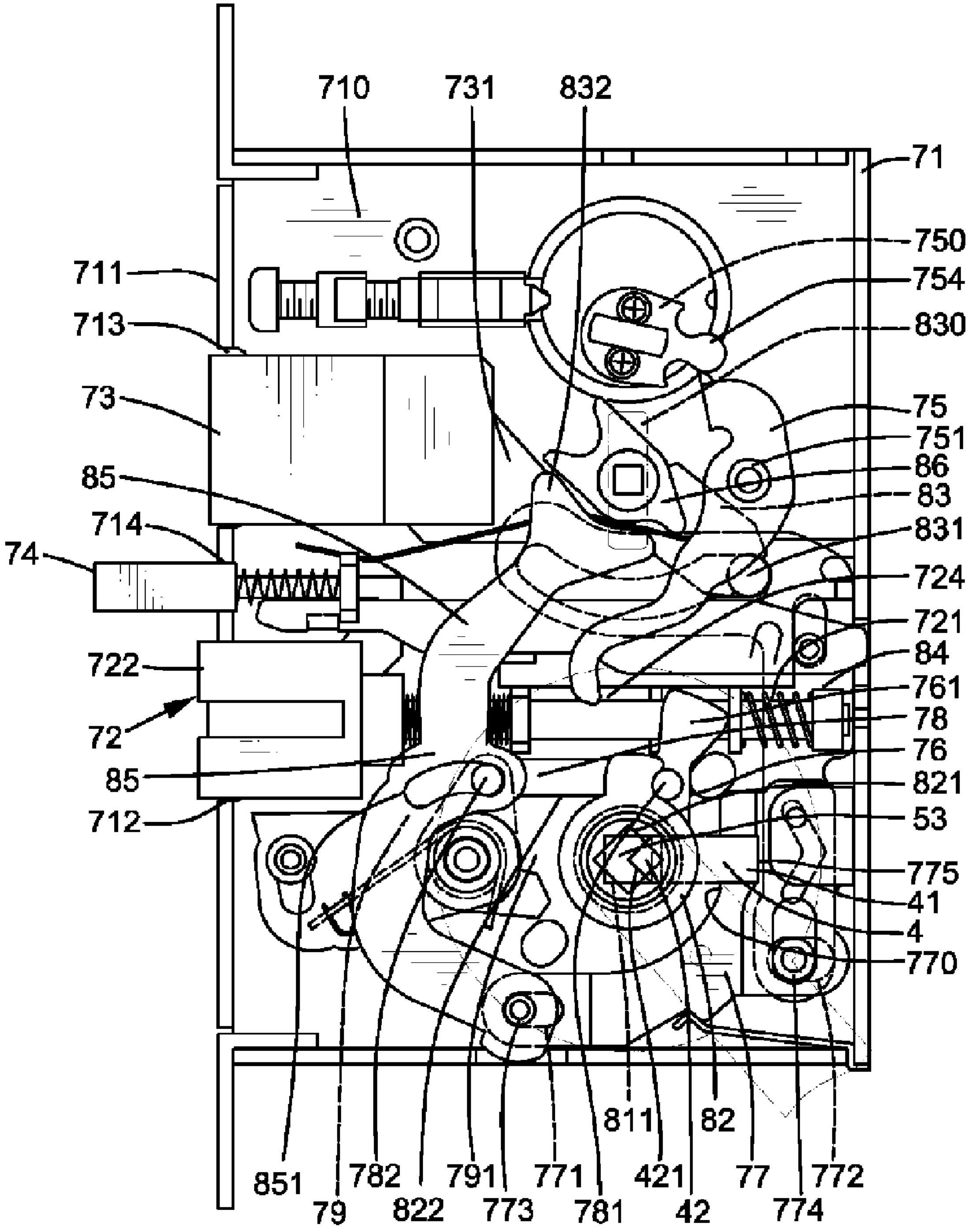
FIG. 4 is a view similar to FIG. 3, wherein a latch bolt is retracted upon turning of either handle of the lock.

Referring to FIGS. 3 and 4, when the lock is in an unlocked state, operation of either handle 51, 61 causes rotation of the wheel 81, 82, resulting in retraction of the latch bolt 72, as mentioned above.

Figure 5:
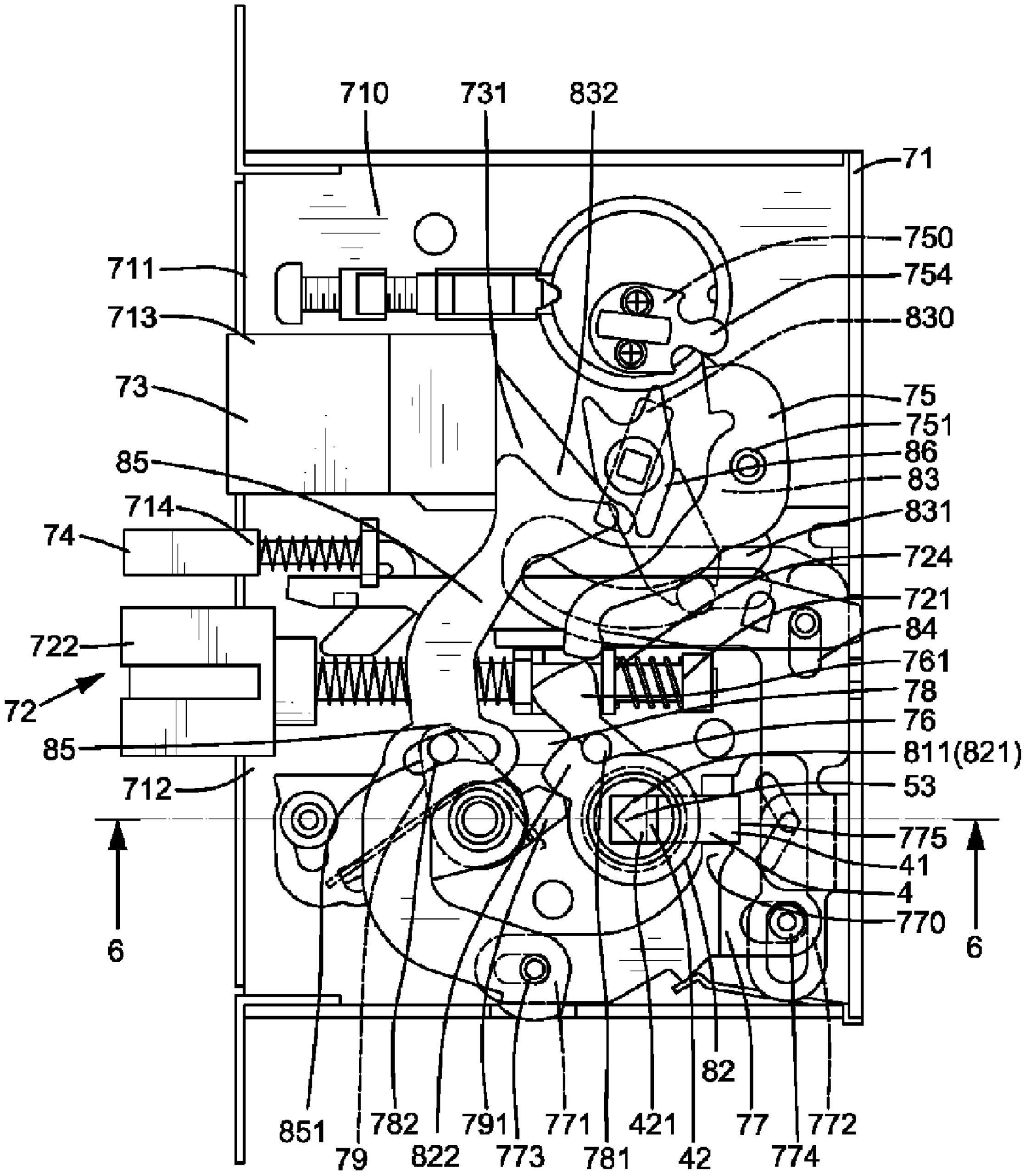
FIG. 5 is a view similar to FIG. 3, wherein a locking plug is moved leftward to lock the latch bolt.
Figure 6:
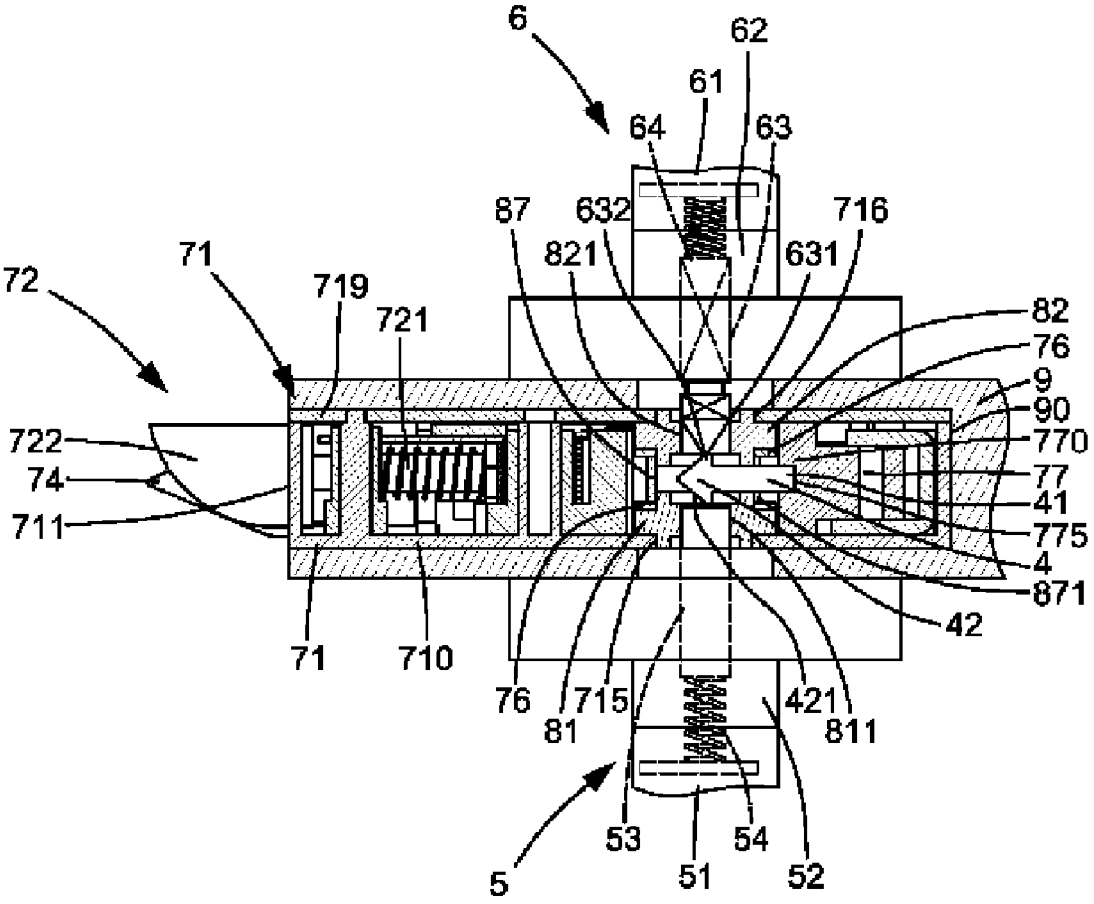
FIG. 6 is a sectional view taken along plane 6-6 in FIG. 5.

Referring to FIGS. 5 and 6, when the locking plug 77 is moved leftward for blocking purposes, the push member 4 fixed on the face 770 of the locking plug 77 moves together with the locking plug 77 in the moving direction of the latch bolt 72. At this time, since the push member 4 and the extension 632 of the outside spindle 63 are in contact with each other and extend in directions transverse to each other, inward movement of the push member 4 causes the outside spindle 63 to move away from the through-hole 821 of the wheel 82 in the longitudinal direction of the outside spindle 63. Thus, the outside spindle 63 is disengaged from the wheel 82, as the conic face of the extension 632 is not in contact with the circumferential wall defining the through-hole 821 of the wheel 82.

Figure 7:
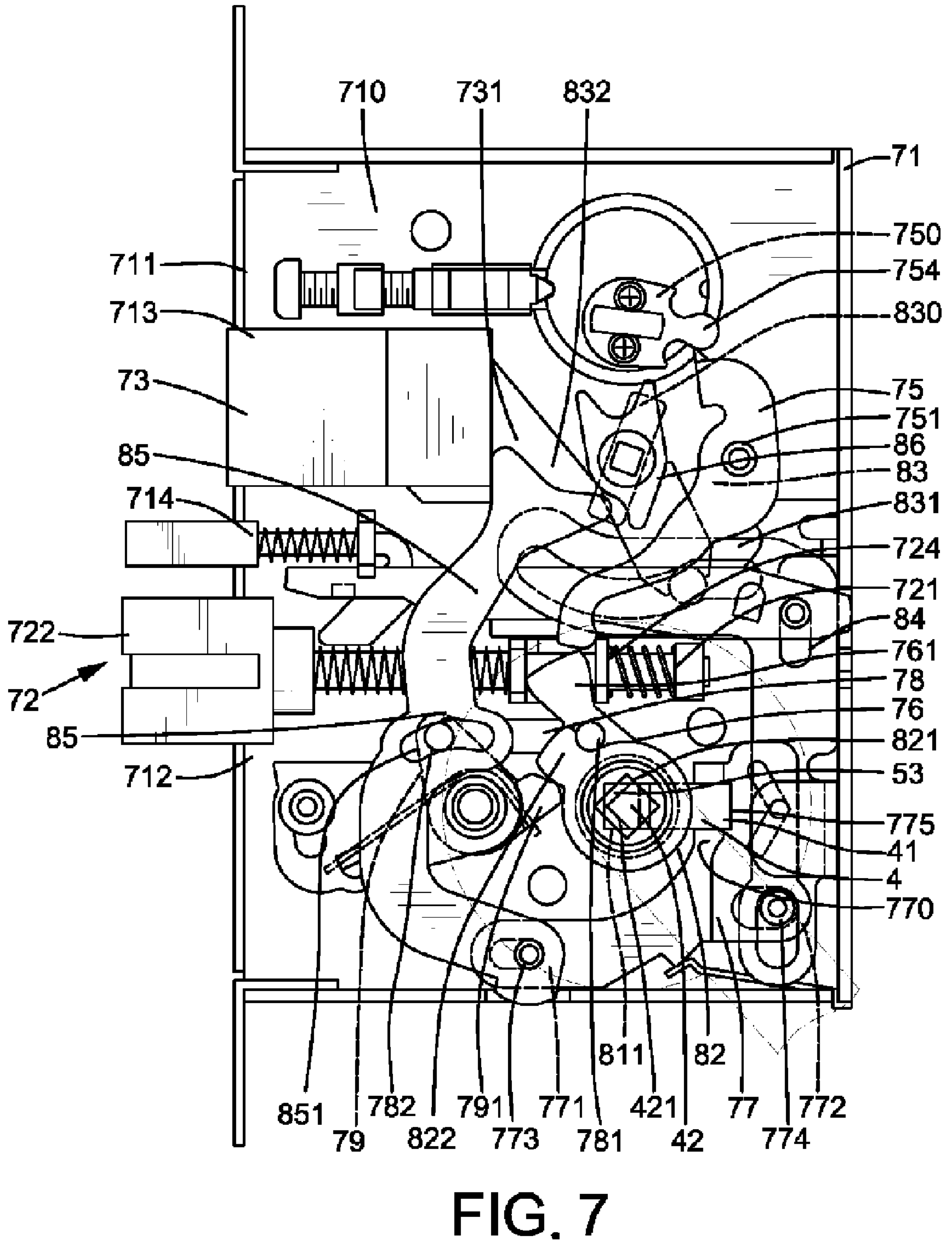
FIG. 7 is a view similar to FIG. 5, illustrating turning of the outside handle.

Referring to FIGS. 6 and 7, after the front end 631 of the outside spindle 63 is disengaged from the wheel 82, transmission of the torque from the outside spindle 63 to the wheel 82 is impossible. Thus, turning of the outside handle 61 is idle when the lock is in the locked state. In other words, the outside handle 61 pivots idly, preventing the internal elements of the lock from being damaged in a case that a relatively large force is applied to the outside handle 61.

The lock in accordance with the present invention is simplified in structure and thus allows easier assembly. Operation of the push member 4 and the outside spindle 63 is reliable by the provision of the inclined face 421 of the push member 4 and the conic face of the extension 632 of the outside spindle 63. Nevertheless, the present invention is not limited to the arrangement of the inclined face 421 of the push member 4 and the conic face 633 of the extension 632 of the outside spindle 63 shown in the figures. Namely, other equivalent arrangements with different shapes and/or different engaging orientations are allowed.

Although a specific embodiment has been illustrated and described, numerous modifications and variations are still possible without departing from the essence of the invention. The scope of the invention is limited by the accompanying claims.

What is claimed is:

1. A lock comprising:

a body;

a latch bolt mounted in the body;

a wheel pivotally mounted in the body and operable to retract the latch bolt from an extended position to a retracted position, the wheel including a through-hole defined by a circumferential wall;

an outside spindle adapted to be mounted to an outside handle, the outside spindle including a front end having an extension, the extension being not in contact with the circumferential wall of the through-hole of the wheel;

a spring mounted in the outside handle for biasing the front end of the outside spindle into the through-hole of the first wheel, allowing joint rotation of the wheel and the outside spindle;

a locking plug mounted in the body and movable between an unblocking position allowing retraction operation of the latch bolt and a blocking position not allowing retraction operation of the latch bolt; and a push member mounted on the locking plug;

wherein when the locking plug is in the unblocking position, the front end of the outside spindle is engaged with the wheel to allow joint rotation of the outside spindle and the wheel; and wherein when the locking plug is moved from the unblocking position to the blocking position, movement of the push member pushes the front end of the outside spindle away from the through-hole of the wheel such that the front end of the outside spindle is disengaged from the circumferential wall of the through-hole of the wheel, thereby disengaging the outside spindle from the wheel.

2. The lock as claimed in claim 1, with the lock further comprising another wheel pivotally mounted in the body and adapted for cooperating with an inside spindle, said another wheel being operable to retract the latch bolt from the extended position to the retracted position, further comprising a spacer ring between the wheel and said another wheel, the spacer ring including an opening, the front end of the push member extending through the opening of the spacer ring to a position between the wheel and said another wheel.

3. The lock as claimed in claim 1, with the extension of the outside spindle being remained in and not in contact with the circumferential wall defining the through-hole of the wheel when the locking plug is in the blocking position.

4. The lock as claimed in claim 1, with the push member being a member releasably mounted to the locking plug.

5. The lock as claimed in claim 4, with the locking plug including a recess, with the push member including a rear end mounted in the recess and a front end having an inclined face for pressing against and thus moving the extension of the outside spindle.

6. The lock as claimed in claim 4, with the front end of the push member being arrow-shaped.

7. The lock as claimed in claim 1, with the push member including an arrow-shaped end having an inclined face for pressing against and thus moving the extension of the outside spindle.

8. The lock as claimed in claim 1, with the push member extending in a direction transverse to the longitudinal direction of the outside spindle.

9. The lock as claimed in claim 1, with the extension of the outside spindle being conic.

10. The lock as claimed in claim 9, with the with the push member being a member releasably mounted to the locking plug.

11. The lock as claimed in claim 9, with the locking plug including a recess, with the push member including a rear end mounted in the recess and a front end having an inclined face for pressing against and thus moving the extension of the outside spindle.

12. The lock as claimed in claim 11, with the front end of the push member being arrow-shaped.

13. The lock as claimed in claim 9, with the push member including an arrow-shaped end having an inclined face for pressing against and thus moving the extension of the outside spindle.

14. The lock as claimed in claim 9, with the push member extending in a direction transverse to the longitudinal direction of the outside spindle.

* * * * *